US007148998B2

(12) United States Patent
Baggs et al.

(10) Patent No.: US 7,148,998 B2
(45) Date of Patent: Dec. 12, 2006

(54) SYSTEM AND METHOD FOR AUTOMATIC DESCREENING OF DIGITAL IMAGES

(75) Inventors: Scott C. Baggs, Fort Collins, CO (US); David W. Boll, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 995 days.

(21) Appl. No.: 10/160,396

(22) Filed: May 31, 2002

(65) Prior Publication Data

US 2003/0231801 A1 Dec. 18, 2003

(51) Int. Cl.
*H04N 1/40* (2006.01)
*H04N 1/409* (2006.01)
*G06K 9/03* (2006.01)
*G06K 9/34* (2006.01)
*G06K 9/40* (2006.01)
*G06T 5/00* (2006.01)

(52) U.S. Cl. .................. 358/2.1; 358/3.08; 358/3.26; 358/474; 382/176; 382/264; 382/275; 382/318

(58) Field of Classification Search ............... 358/1.9, 358/3.26, 3.06–3.08, 463, 474, 2.1, 462, 358/533–536; 382/176, 205, 254, 264, 275, 382/318–319
See application file for complete search history.

(56) References Cited

U.S. PATENT DOCUMENTS

| 4,194,221 A | 3/1980 | Stoffel |
| 4,288,821 A | 9/1981 | Lavallee et al. |
| 4,433,346 A | 2/1984 | Stoffel et al. |
| 4,630,125 A | 12/1986 | Roetling |
| 5,239,390 A * | 8/1993 | Tai .............................. 358/3.26 |
| 5,327,262 A | 7/1994 | Williams ..................... 358/462 |
| 5,339,172 A | 8/1994 | Robinson .................... 358/462 |
| 5,341,226 A | 8/1994 | Shiau |
| 5,798,846 A * | 8/1998 | Tretter ......................... 382/262 |
| 5,852,678 A * | 12/1998 | Shiau et al. ................. 382/176 |
| 6,172,769 B1 | 1/2001 | Rao et al. .................... 358/1.9 |
| 6,185,335 B1 | 2/2001 | Karidi et al. ............... 382/224 |
| 6,304,684 B1 * | 10/2001 | Niczyporuk et al. ........ 382/318 |
| 6,646,760 B1 * | 11/2003 | Hanihara ..................... 358/1.9 |
| 2004/0141209 A1* | 7/2004 | Marumoto et al. ......... 358/3.26 |

FOREIGN PATENT DOCUMENTS

EP   0624848 A3   11/1994

* cited by examiner

Primary Examiner—Scott A. Rogers

(57) ABSTRACT

A system and method for automatic descreening of a digital image is disclosed. The method comprises automatically detecting, prior to a final scan of the document, the presence of a predefined visual artifact in a sample region of an image of the document being scanned; performing the final scan of the document to obtain the digital image; and automatically descreening the digital image to obtain a final digital image of the document in response to the automatic detection of the predefined visual artifact.

34 Claims, 2 Drawing Sheets

SYSTEM AND METHOD FOR AUTOMATIC DESCREENING OF DIGITAL IMAGES

TECHNICAL FIELD OF THE INVENTION

The present invention relates generally to the field of digital imaging, and more particularly to a system and method for automatic descreening of digital images.

BACKGROUND OF THE INVENTION

Scanners are increasingly being used to scan different types of documents, such as paper documents, photographs, negatives, transparencies, and/or the like. However, users of such scanners have to enter various scan settings in order to obtain a digital image of acceptable quality. Visual artifacts often appear in the digital image that degrade the quality of the scanned image. Moire patterns are a visual artifact that typically appear as a grid or a screen superimposed on the digital image due to the presence of halftone in the document being scanned. This problem is more pronounced in the case of printed documents, for example, newsprint, magazines and books, than other types of documents, such as photographs. Moreover, this problem is often quite pronounced in the case of digital images of non-textual portions of the document.

SUMMARY OF THE INVENTION

In accordance with an embodiment of the present invention, a method for automatically improving a digital image of a document is disclosed. The method comprises automatically detecting, prior to a final scan of the document, the presence of a predefined visual artifact in a sample region of an image of the document being scanned, performing the final scan of the document to obtain the digital image, and automatically descreening the digital image to obtain a final digital image of the document in response to the automatic detection of the predefined visual artifact.

In accordance with another embodiment of the present invention, a system for automatically improving a digital image of a document is disclosed. The system comprises means for automatically detecting, prior to a final scan of the document, the presence of a predefined visual artifact in a sample region of an image of the document being scanned, means for performing the final scan of the document to obtain the digital image, and means for automatically descreening the digital image to obtain a final digital image of the document in response to the automatic detection of the predefined visual artifact.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1A:
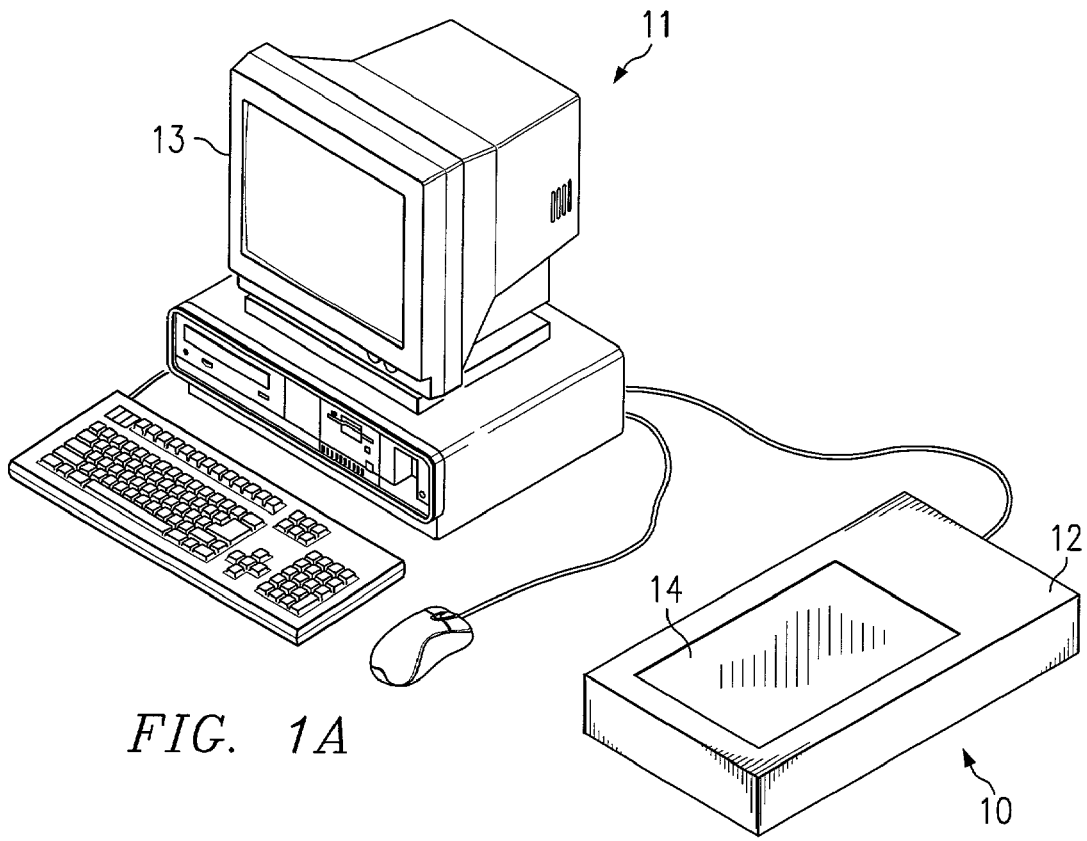
FIGS. 1A and 1B are perspective views of an image capture device which may use embodiments of the present invention to advantage.
Figure 1B:
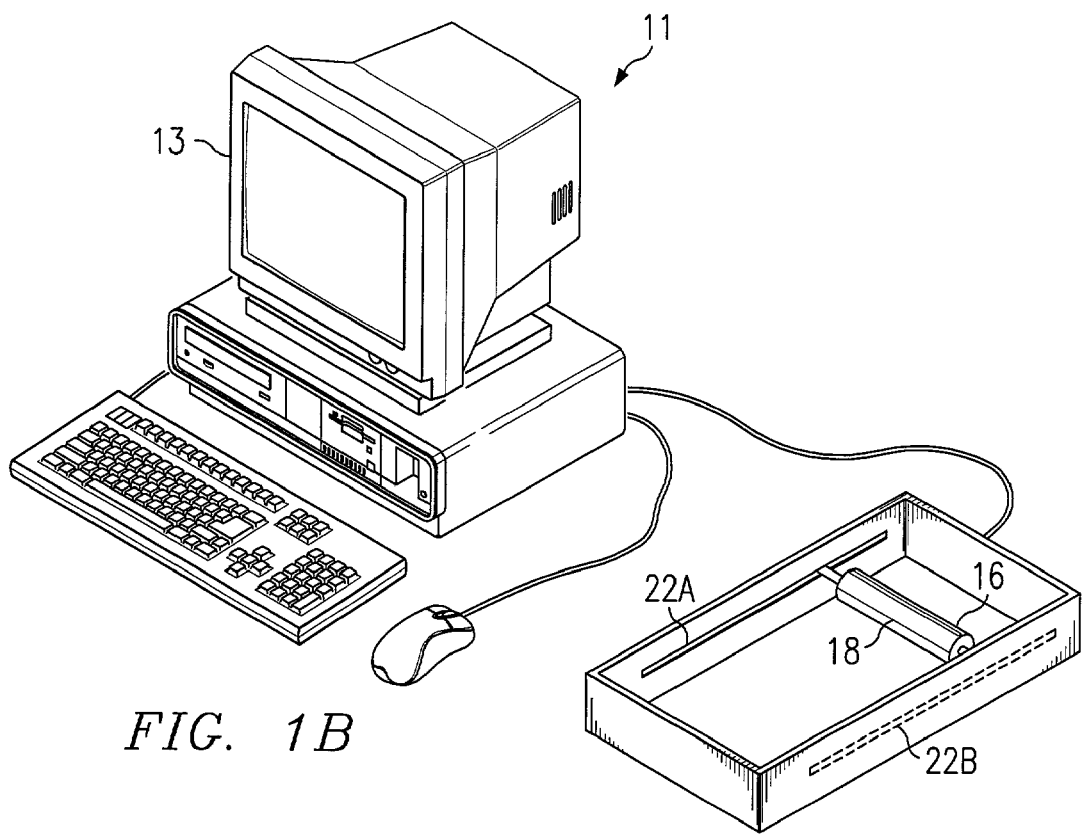
Figure 2:
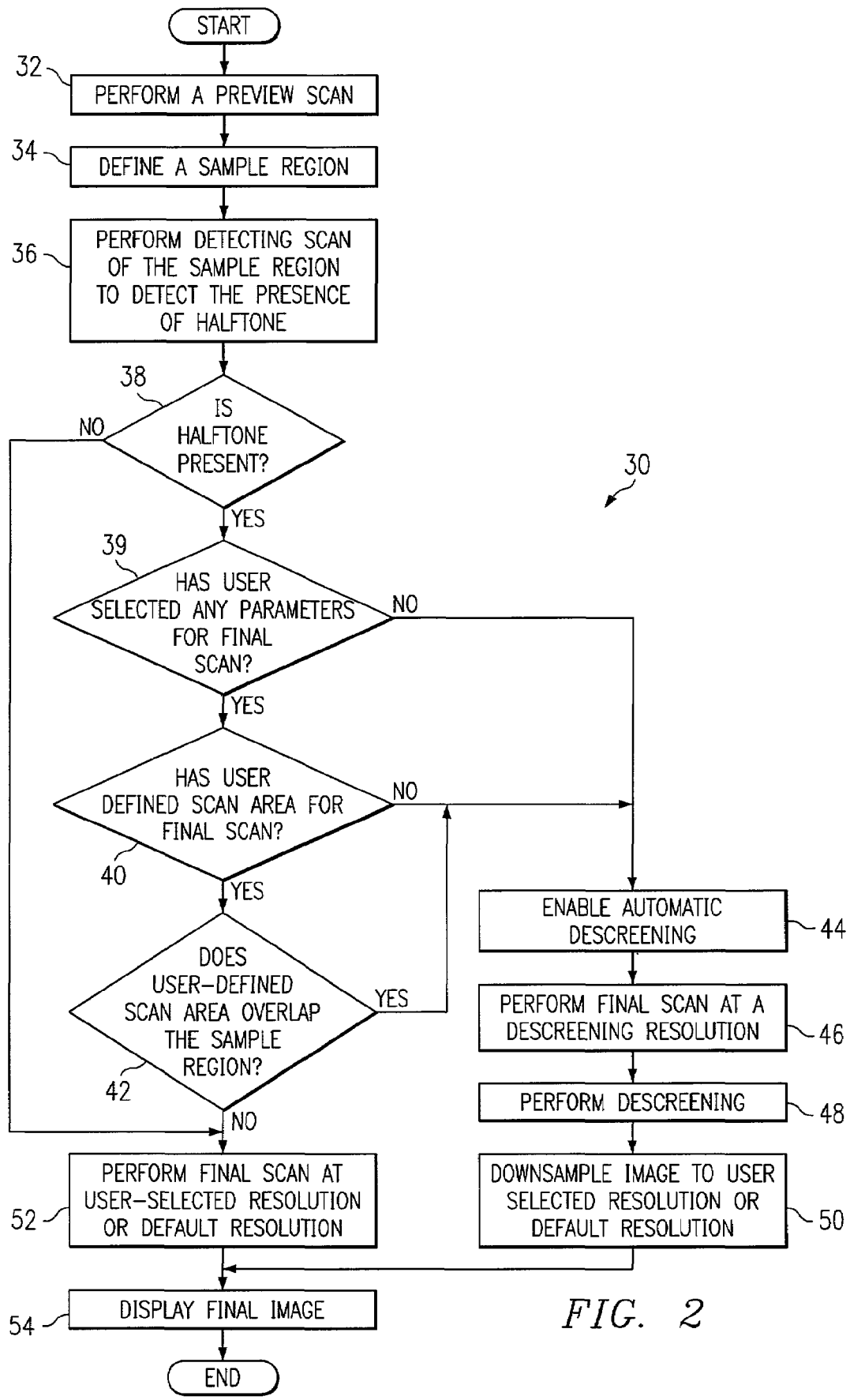
FIG. 2 is a flowchart of a method for automatic descreening of a digital image in accordance with an embodiment of the present invention.

The preferred embodiment of the present invention and its advantages are best understood by referring to FIGS. 1 through 2 of the drawings, like numerals being used for like and corresponding parts of the various drawings.

The present invention will be described herein with reference to an image capture device. However, the invention is not so limited and the teachings of the present invention may be used with respect to other types of image capture devices, such as photocopiers, facsimile machines, printers, digital cameras and/or the like.

FIG. 1A is a perspective view of an image capture device 10 in the form of a scanner, such as a flatbed scanner, and FIG. 1B is a perspective view of flatbed scanner 10 with the top cover 12 removed. If desired, image capture device 10 may instead be part of a copier, a multi-function device, a facsimile machine, or other machine that makes a digital image for storage, transmission or further processing. The terms "image capture device", "flatbed scanner", and "scanner" are used interchangeably herein. Scanner 10 includes a platen 14 against which an object to be scanned, such as a document or other item, may be placed. Scanner 10 may be coupled to a computer system 11 to facilitate control and operation of scanner 10.

Preferably, a carriage 16 disposed in scanner 10 supports one or more scanning devices or subsystems, such as a light source 18, an internal optical system (not shown) and a photosensitive device (not shown). Carriage 16 is capable of moving along one or more support rails 22A and 22B. As carriage 16 moves along support rails 22A and 22B, light source 18 radiates light that passes through platen 14 and is reflected off the document placed thereon. The reflected light is collected by the internal optical system and directed onto the photosensitive device. The photosensitive device converts the reflected light of light source 18 into one or more electrical signals.

A typical scanning operation involves two separate scans, a preview scan and a final scan. After the user initiates a scanning operation, a preview scan is performed by the scanner. During the preview scan, carriage 16 moves from an initial position to a final position scanning the object at a low resolution to provide an initial digital image. The low resolution scanning allows the preview scan to be quickly performed. After the preview scan is completed, carriage 16 returns to its initial position near one end of the scanner.

After the preview scan, the user can select and set the values of various parameters, such as resolution of the scan, color, scan area, exposure and/or the like for the final scan. The user makes these parameter adjustments and settings based at least in part on how the initial digital image looked, as displayed on a computer screen 13 communicatively coupled to the scanner. The final scan is then performed based at least in part on the parameters set by the user. During the final scan, carriage 16 once again moves from the initial position toward the final position to scan the object based on the selected parameters, for example at the selected resolution, to provide the final digital image. After carriage 16 reaches the final position thereby completing the final scan, it again moves back to the initial position.

In existing systems, once the final scan is completed the user may visually inspect the final digital image. The user may detect undesirable visual artifacts, such as Moire patterns, present in the final digital image. A visual artifact may include other defects or inconsistencies besides Moire patterns, such as dust and/or the like. The existence of Moire patterns in the final digital image indicates that at least part of the object scanned is halftoned. If Moire patterns are present, then the user may manually enable descreening and then rescan the object to obtain a final digital image without Moire patterns. Descreening involves removing or reducing the Moire patterns from the digital image. In existing systems, the user may enable descreening by means of a software user interface installed on computer system 11 with which the scanner is coupled. Thus, in existing systems, in order to reduce or remove Moire patterns from a digital image, the user has to visually determine the existence of Moire patterns and then repeat the scanning process after manually enabling descreening through the software user interface.

An alternative to the existing approach would be to enable descreening for all scans irrespective of the presence of Moire patterns. While this alternative would not require the user to visually determine the presence of Moire patterns, the scan time would be increased and in some cases the quality of the resultant image would be deleteriously affected. Thus, enabling descreening for all scans would unnecessarily increase the scan time and also affect the quality of the images in cases where Moire patterns are not present.

Accordingly, there is a desire for a system and method for automatic descreening of digital images. A system and method for automatically detecting the presence of halftone in an object and descreening in response to detection of halftone is disclosed.

FIG. 2 is a flowchart of a method 30 for automatic descreening of a digital image in accordance with an embodiment of the present invention. A document to be scanned, such as a paper document, a photograph, a negative, a transparency, or another item, is placed on platen 14 of scanner 10. In step 32, a preview scan is performed. The preview scan is preferably performed at a predetermined low resolution. For example, the resolution of the preview scan may be set at 75 dpi (dots per inch). During the preview scan, the low resolution digital image of the object is substantially simultaneously displayed on computer screen 13 associated with computer system 11 with which scanner 10 is coupled.

In step 34, a region of the document is defined as a sample region. Image data obtained during the preview scan is preferably analyzed to determine the locations of non-textual data in the image. The presence of color data usually indicates the presence of non-textual data. In the preferred embodiment, the sample region is defined to include areas of the document that has non-textual data because the non-textual area is more likely to have halftone and therefore is more likely to exhibit Moire patterns in the digital image. However, the invention is not so limited and if desired, other portions of the object may be defined as the sample region. If desired, the sample region may include more than one non-contiguous regions of the document and may include all regions of non-textual data.

In step 36, a detecting scan is performed on the sample region to detect the presence of halftone in the document. In order to detect the presence of halftone, the detecting scan is performed at a high resolution, say 600 dpi. Performing a scan at a high resolution is time consuming. As such, the detecting scan is preferably performed only over the sample region. During the detecting scan, carriage 16 is moved from the initial position towards the final position for scanning the sample region. Once the scan of the sample region is complete carriage 16 returns to the initial position.

Although the above-disclosed embodiment includes a preview scan step (step 32) and a separate step for detecting halftone (step 36), the invention is not so limited. In an alternative embodiment, the preview scan and the detecting scan may be performed in the same step. In such an embodiment, different portions of the document are scanned at different resolutions during the same scanning operation. Upon initiation of the scan, carriage 16 moves from the initial position towards the final position scanning the document at a low resolution. During the scanning process, when a region of non-textual data is detected, scanning is performed at a high resolution. The presence of color data presumably indicates the presence of non-textual data. If desired, only a portion of the non-textual data may be scanned at the high resolution. Scanning is switched back to a low resolution when the desired portion of the document has been scanned at the high resolution. When the entire document has been scanned, carriage 16 returns to the initial position.

In step 38, a determination is made as to whether halftone is present in the sample region. The image data obtained from the detecting scan is analyzed to determine the presence of halftone. Halftone may be detected by any conventional method for halftone detection now known or later developed. In the preferred embodiment, a fast Fourier transform may be applied to the image data obtained from the detecting scan to determine the spatial frequency components of the image data. A comparison is performed to determine whether any of the determined frequencies match known halftone resolutions. For example, usually halftone frequencies range from 85 to 185. If the determined frequencies match known halftone resolutions, then it may be concluded that halftone is present. If halftone is not present, then the process starting at step 52 is executed. If halftone is present, then the process starting at step 39 is executed.

In step 39, a determination is made as to whether the user has selected and set any parameters for the final scan. Prior to the final scan, the user may select different parameters to be used in performing the final scan. The different parameters may be selected, for example, by using a graphical user interface of a software associated with the scanner. One or more of the following parameters may be selected by the user, for example scan area, resolution, exposure time, type of scan and/or the like. If the user has not selected and set any parameters for the final scan, then the process starting at step 44 is executed. If the user has selected and set at lease one parameter for the final scan, then the process starting at step 40 is executed.

In step 40, a determination is made as to whether the user has defined a scan area for the final scan. If the user has not defined a scan area for the final scan, then the process starting at step 44 is executed. If the user has defined a scan area for the final scan, then the process starting at step 42 is executed.

In step 42, a determination is made as to whether the user-defined scan area and the sample region used in step 36 at least partially overlap. If the user-defined scan area and the sample region at least partially overlap, then the process starting at step 44 is executed to enable descreening. If the user-defined scan area and the sample region do not overlap, then it is preferably presumed that the user-defined scan area does not include any portions with Moire patterns. Performing the descreening operation in such a case would not have any significant effect on the image quality and may unnecessarily increase the scan time. As such, the descreening operation may be omitted and the process starting at step 52 is executed.

In step 44, automatic descreening is enabled for the final scan. In an alternative embodiment, if desired, automatic descreening may be enabled in response to a user input. For example, the user may be informed that halftone is present in the user selected scan area and the user may be encouraged or prompted to either agree or disagree with permitting automatic descreening to proceed.

In step 46, a final scan of the user-defined scan area is performed at a descreening resolution to obtain a final image. The descreening resolution is most likely a resolution higher than a user-selected resolution to later achieve a final scanned image at the user-selected resolution. Thus, if the user has selected a particular resolution for the final scan, then the descreening resolution is preferably a predetermined multiple of the user-selected resolution or a predetermined multiple of the frequency of the halftone, whichever is higher. The multiple to be used may depend on the type of scanner, the frequency of the halftone, and/or the like. If the user has not selected a resolution for the final scan, then the descreening resolution is a predetermined resolution. The predetermined resolution is preferably a multiple of the frequency of the halftone and is preferably at least twice as much.

In step 48, the image data of the final scan is descreened. Any conventional method for descreening now known or later developed may be used for descreening. In the preferred embodiment, descreening is performed by low-pass filtering the image data of the final scan to obtain a filtered image. Low-pass filtering the image data smoothes the image data so that the undesirable effect of downsampling as applied in the next step is reduced or completely eliminated.

In step 50, the filtered image data is downsampled to the user selected final scan resolution, if any. If the user did not select a resolution for the final scan, then the filtered image data is downsampled to a default resolution. Any conventional method for downsampling now known or developed later may be used. In step 54, the final scanned image may be displayed.

The process starting at step 52 may be executed if halftone is not present or the user-defined final scan area and the sample region do not overlap. In step 52, a final scan of the document is performed at the user-selected final scan resolution, if any. If the user did not select a final scan resolution, then the final scan may be performed at a default final scan resolution, say 300 dpi. In step 54, the final scanned image may be displayed.

The present invention may be implemented in software, hardware, or a combination of both software and hardware. The software and/or hardware may reside on image capture device 10 or computer system 11. If desired, part of the software and/or hardware may reside on image capture device 10 and part of the software and/or hardware may reside on computer system 11.

Although, the preferred embodiment of the present invention as described above includes a preview scan step (step 32) and a step for defining the sample region (step 34) on which the detecting scan (step 36) is performed, the invention is not so limited. In an alternative embodiment, the presence of halftone may be detected by applying the detecting scan to a predefined area of the object. For example, one or more parameters may be set so that the detecting scan is performed near an index marked corner of platen 14. If desired, the different steps discussed herein may be performed in any order and/or concurrently with each other. Furthermore, if desired, one or more of the above described steps may be optional or may be combined without departing from the scope of the present invention.

Although, the preferred embodiment of the present invention has been described above with reference to removing Moire patterns, the invention is not so limited. The teachings of the present invention may be used for removal of other types of visual artifacts, such as dust, from an image. The teachings of the present invention are especially useful for removing visual artifacts that may be detected by analyzing a sample region and/or the removal of which is computationally intensive.

What is claimed is:

1. A method for automatically improving a digital image of a document, comprising:
   automatically detecting, prior to a final scan of said document, the presence of a predefined visual artifact in a sample region of an image of said document being scanned;
   performing said final scan of said document at a descreening resolution to obtain said digital image; and
   automatically descreening said digital image to obtain a final digital image of said document in response to said automatic detection of said predefined visual artifact.

2. The method of claim 1, further comprising defining at least a portion of said image of said object as said sample region.

3. The method of claim 1, further comprising performing a preview scan of said document to determine said sample region.

4. The method of claim 1, further comprising:
   determining at least one non-textual portion of said image of said document being scanned; and
   defining said at least one non-textual portion as said sample region.

5. The method of claim 1, wherein automatically detecting the presence of said predefined visual artifact comprises:
   performing a preview scan of at least a portion of said document at a first resolution;
   determining at least one non-textual portion of said document;
   performing a detecting scan of said at least one non-textual portion at a second resolution; and
   detecting the presence of said predefined visual artifact in said at least one non-textual portion.

6. The method of claim 1, wherein automatically descreening said digital image comprises:
   low-pass filtering said digital image to obtain filtered image data; and
   downsampling said filtered image data to obtain said final digital image.

7. The method of claim 6, wherein said downsampling said filtered image data comprises downsampling said filtered image data to a user-defined resolution to obtain said final digital image.

8. The method of claim 6, wherein said downsampling said filtered image data comprises downsampling said filtered image data to a default resolution to obtain said final digital image.

9. The method of claim 1, wherein said predefined visual artifact is a Moire pattern.

10. The method of claim 1, wherein said descreening resolution is higher than a user-defined final scan resolution.

11. The method of claim 1, wherein said descreening resolution is equal to a user-defined final scan resolution.

12. The method of claim 1, wherein said descreening resolution is a multiple of a user-defined final scan resolution.

13. A method for automatically improving a digital image of a document, comprising:
   determining at least one non-textual portion of an image of said document;

automatically detecting a predefined visual artifact in said at least one non-textual portion prior to a final scan;

performing said final scan of said document to obtain said digital image; and automatically descreening said digital image to obtain a final digital image of said document in response to detecting said predefined visual artifact in said at least one non-textual portion.

14. The method of claim 13, further comprising performing a detecting scan of said at least one non-textual portion at a high resolution.

15. The method of claim 13, further comprising performing a preview scan of said at least one non-textual portion at a high resolution.

16. The method of claim 13, further comprising:

low-pass filtering said digital image to obtain a filtered image; and downsampling said filtered image to obtain said final digital image.

17. The method of claim 13, wherein said descreening resolution is a high resolution.

18. The method of claim 13, further comprising receiving input regarding a scan area for said final scan.

19. The method of claim 18, further comprising performing said final scan in response to said scan area overlapping said at least one non-textual portion.

20. A system for automatically improving a digital image of a document, comprising:

means for automatically detecting, prior to a final scan of said document, the presence of a predefined visual artifact in a sample region of an image of said document being scanned;

means for performing said final scan of said document at a descreening resolution to obtain said digital image; and means for automatically descreening said digital image to obtain a final digital image of said document in response to said automatic detection of said predefined visual artifact.

21. The system of claim 20, further comprising:

means for determining at least one non-textual portion of said image of said document being scanned; and means for defining said at least one non-textual portion as said sample region.

22. The system of claim 20, wherein said means for automatically detecting the presence of said predefined visual artifact comprises means for performing a preview scan of at least a portion of said document at a first resolution.

23. The system of claim 20, wherein said means for automatically detecting the presence of said predefined visual artifact comprises:

means for determining at least one non-textual portion of said document;

means for performing a detecting scan of said at least one non-textual portion at a first resolution; and means for detecting the presence of said predefined visual artifact in said at least one non-textual portion.

24. The system of claim 20, wherein said means for automatically descreening said digital image comprises:

means for low-pass filtering said digital image to obtain filtered image data; and means for downsampling said filtered image data to obtain said final digital image.

25. The system of claim 20, wherein said predefined visual artifact is a Moire pattern.

26. A method for automatically improving a digital image of a document, comprising:

automatically detecting, prior to a final scan of said document, the presence of halftone in at least a portion of said document being scanned;

performing said final scan of said document to obtain said digital image; and automatically descreening said digital image to obtain a final digital image of said document in response to said automatic detection of halftone.

27. A system for automatically improving a digital image of a document, comprising:

an image capture device; and application logic operatively associated with said image capture device and operable to:

automatically detect, prior to a final scan of said document, the presence of a predefined visual artifact in a sample region of an image of said document being scanned;

perform said final scan of said document at a descreening resolution to obtain said digital image; and P2 automatically descreen said digital image to obtain a final digital image of said document in response to said automatic detection of said predefined visual artifact.

28. The system of claim 27, said application logic further operable to define at least a portion of said image of said object as said sample region.

29. The system of claim 27, said application logic further operable to perform a preview scan of said document to determine said sample region.

30. The system of claim 27, said application logic further operable to: determine at least one non-textual portion of said image of said document being scanned; and define said at least one non-textual portion as said sample region.

31. The system of claim 27, said application logic further operable to perform a preview scan of at least a portion of said document at a first resolution.

32. The system of claim 27, said application logic further operable to: determine at least one non-textual portion of said document; perform a detecting scan of said at least one non-textual portion at a first resolution; and detect the presence of said predefined visual artifact in said at least one non-textual portion.

33. The system of claim 27, said application logic further operable to: low-pass filter said digital image to obtain filtered image data; and downsample said filtered image data to obtain said final digital image.

34. The system of claim 27, wherein said predefined visual artifact is a Moire pattern.

* * * * *

UNITED STATES PATENT AND TRADEMARK OFFICE
CERTIFICATE OF CORRECTION

PATENT NO. : 7,148,998 B2  Page 1 of 1
APPLICATION NO. : 10/160396
DATED : December 12, 2006
INVENTOR(S) : Scott C. Baggs et al.

It is certified that error appears in the above-identified patent and that said Letters Patent is hereby corrected as shown below:

In column 7, line 3, in Claim 13, after "document" insert -- at a descreening resolution --.

In column 8, line 13, in Claim 26, after "document" insert -- at a descreening resolution --.

In column 8, line 30, in Claim 27, delete "P2" before "automatically".

Signed and Sealed this

Fifth Day of May, 2009

JOHN DOLL
*Acting Director of the United States Patent and Trademark Office*